United States Patent [19]

Daniels

[11] Patent Number: 4,711,945

[45] Date of Patent: Dec. 8, 1987

[54] POLYKETONE

[75] Inventor: James A. Daniels, Cheshire, England

[73] Assignee: Imperial Chemical Industries PLC, London, England

[21] Appl. No.: 801,404

[22] Filed: Nov. 25, 1985

[30] Foreign Application Priority Data

Nov. 23, 1984 [GB] United Kingdom ................. 8429609

[51] Int. Cl.$^4$ .............................................. C08G 65/40
[52] U.S. Cl. ...................................... 528/86; 528/125; 528/126; 528/128; 528/219
[58] Field of Search ................. 528/86, 125, 126, 128, 528/219

[56] References Cited

U.S. PATENT DOCUMENTS

| | | | |
|---|---|---|---|
| 3,332,909 | 7/1967 | Farnham et al. | 528/219 |
| 4,320,224 | 3/1982 | Rose et al. | 528/125 |
| 4,360,630 | 11/1982 | Smith | 528/125 |
| 4,513,131 | 4/1985 | Reinhardt et al. | 528/125 |
| 4,547,592 | 10/1985 | Reinhardt et al. | 526/285 |

OTHER PUBLICATIONS

L. M. Roebson et al., "Synthesis and Dynamic Mechanical Characteristics of Poly(Aryl Ethers)", *Applied Polymer Symposium*, No. 26, pp. 373-385, (1975).

*Primary Examiner*—John Kight III
*Assistant Examiner*—M. L. Moore
*Attorney, Agent, or Firm*—Cushman, Darby & Cushman

[57] ABSTRACT

Polyaryletherketones are prepared by polymerization of a halogen-containing aryl ketone in the presence of a stoichiometric excess of a base and a copper salt. The halogen-containing aryl ketone may be 4-chloro-4'-hydroxybenzophenone. A basic copper salt may be used but the base used to provide the excess of base is an alkali metal hydroxide, carbonate or bicarbonate.

10 Claims, No Drawings

POLYKETONE

The present invention relates to the production of aromatic polymers and, in particular, to the production of polyaryletherketones.

A number of methods have been proposed for the preparation of aromatic polyaryletherketones by which is meant polymers whose molecular chains contain, inter alia, phenylene groups, oxygen atoms and ketone groups. A number of such methods are based on the electrophilic process and require the use of Lewis acid catalysts, in particular hydrogen fluoride in the presence of boron trifluoride. Other methods are based on the nucleophilic process and involve the reaction of a dihydric phenol with a dihalo-benzoid compound, or the condensation of a suitable halophenol, for example 4-fluoro-4'-hydroxybenzophenone, such reactions being effected in the presence of a base. Bases which may be used in the nucleophilic process include the alkali metal carbonates or bicarbonates or mixtures thereof, or alternatively the alkali metal hydroxides may be used and are preferably pre-reacted with the phenolic groups to form the corresponding alkali metal phenoxide.

The polyketone having the repeating structure

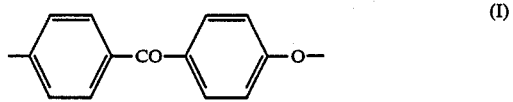

(I)

can be prepared by the reaction of 4,4'-dihydroxybenzophenone with 4,4'-dihalobenzophenone or by the condensation of 4-halo-4'-hydroxybenzophenone. Both of these processes give a satisfactory product when the halogen is fluorine but, on the grounds of monomer cost, the preferred monomer is 4-chloro-4'-hydroxybenzophenone and we have experienced problems in consistently obtaining a polymer of satisfactory properties when using this monomer. Similarly, in the production of other polyaryletherketones the use of the fluorocompound has been found to be desirable in order to achieve the desired properties.

According to the present invention there is provided a process for the preparation of an aromatic polymer which comprises (a) effecting the condensation of at least one halophenol; or (b) effecting the condensation of a mixture of at least one bisphenol with at least one dihalo-benzenoid compound; or (c) effecting the condensation of (i) at least one halophenol and (ii) a mixture of at least one bisphenol with at least one dihalo-benzenoid compound, in the presence of at least a base and at least one copper compound, wherein the base is in a stoichiometric excess relative to the phenolic groups in (a), (b) or (c), at least one of the compounds in (a), (b) or (c) is a compound containing a ketone group, and in the halophenol or the dihalo-benzenoid compound the, or each, halogen atom is activated by an inert electron-withdrawing group in at least one of the positions ortho- or para- to the, or each, halogen atom.

The inert electron-withdrawing group which is present in the halophenol or the dihalobenzenoid compound is preferably in the paraposition to the halogen atom. Whilst any inert electron-withdrawing group may be used, we prefer that this group is a sulphone group (—SO₂—) or a ketone group (—CO—). The inert electron-withdrawing group is most preferably a ketone group contained in the halophenol or dihalo-benzenoid compound.

The at least one halophenol which may be used in accordance with variation (a) of the present invention is preferably a material of the formula

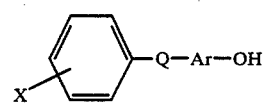

wherein

X is halogen and is ortho or para to Q;

Q is —SO—₂ or —CO—;

Ar is an aromatic radical; and at least the group Q is —CO— or Ar contains a —CO— group.

The group X is typically chlorine.

The aromatic radical Ar is preferably a divalent aromatic radical selected from phenylene, biphenylylene, terphenylene and radicals of the formula

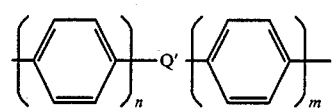

where

Q' is oxygen, sulphur, —CO—, —SO₂—or a divalent aliphatic hydrocarbon radical, and n and m, which may be the same or different, are integers selected from 1, 2 and 3.

When Ar is a phenylene radical, the group —OH is preferably para to the group Q.

Particularly preferred halophenols have the formula

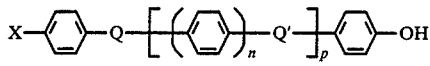

where p is 0 or 1

Examples of suitable halophenols include 4-(4-chlorobenzoyl)phenol 4-(4-bromobenzoyl)phenol 4-hydroxy-4'-(4-chlorobenzoyl)biphenyl, 4-(4-hydroxybenzoyl)-4'-(4-chlorobenzoyl)biphenyl, and 4-hydroxy-4'-(4-chlorobenzoyl)diphenyl ether.

The halophenol containing a —CO— group may be used as a mixture with at least one other halophenol wherein said other halophenol may not contain a —CO— group. Halophenols not containing a —CO— group include 4-(4-chlorophenylsulphonyl)phenol 4-hydroxy-4'-(4-chlorophenylsulphonyl) biphenyl 4-(4-hydroxyphenylsulphonyl)-4'-(4-chlorophenylsulphonyl) biphenyl, and 4-hydroxy-4'-(4-chlorophenylsulphonyl)diphenyl ether.

Mixtures of halophenols which may be employed so as to produce copolymers include 4-(4-chlorobenzoyl)phenol with 4-hydroxy-4'-(chlorobenzoyl)biphenyl, or a mixture of one of the foregoing ketone group—containing compounds with 4-(4-chlorophenylsulphonyl)- phenol, 4-hydroxy-4'-(4-chlorophenylsulphonyl)biphenyl or 4-(4-hydroxyphenyl-sulphonyl)-4'-(4-chlorophenylsulphonyl)biphenyl.

If a mixture of at least one bisphenol with at least one dihalo-benzenoid compound is used in accordance with variation (b) of the present invention, we prefer to avoid the use of certain bisphenols which are liable to react with, and reduce, the copper compound, such bisphenols including hydroquinone. We prefer that the bisphenols used in accordance with variation (b) of the present invention are materials of the formula

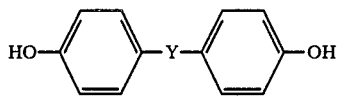

in which Y is oxygen, sulphur, —SO$_2$—, —CO—, a divalent aliphatic hydrocarbon radical or a direct link.

Particularly preferred bisphenols include
4,4'-dihydroxybenzophenone
4,4'-dihydroxydiphenylsulphone
2,2'-bis-(4-hydroxyphenyl)propane
4,4'-dihydroxydiphenyl sulphide
4,4'-dihydroxydiphenyl ether and
4,4'-dihydroxybiphenyl.

The dihalobenzenoid compounds are preferably materials of the formula

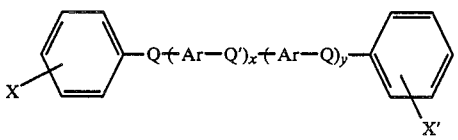

in which
Ar, Q and Q' are as previously defined;
X and X$^1$, which may be the same or different, are halogen atoms and are ortho or para to the groups Q;
x is 0, 1 or 2; and
Y is 0 or 1 and y is one when x is 1 or 2.

The aromatic radical Ar is preferably a divalent hydrocarbon radical selected from phenylene, biphenylylene or terphenylylene. Thus, particularly preferred dihalides have the formula

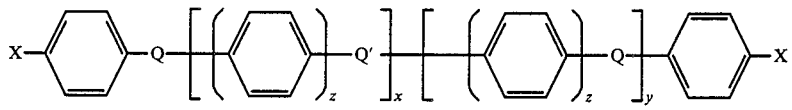

where z is 1, 2 or 3.

Examples of suitable dihalides include
4,4'-dichlorobenzophenone,
bis-1,4-(4-chlorobenzoyl)benzene,
bis-4,4'-(4-chlorobenzoyl)biphenyl,
4,4'-dichlorodiphenylsulphone, and
bis-4,4'-(4-chlorophenylsulphonyl)biphenyl.

Mixtures of bisphenols and/or dihalides may be employed so as to produce copolymers. Examples of mixtures of bisphenols that may be employed include 4,4'-dihydroxybenzophenone with 4,4'-dihydroxydiphenylsulphone or 2,2'-bis-(4-hydroxyphenyl)propane. Examples of mixtures of dihalides that may be employed include 4,4'-dichlorobenzophenone with bis 4,4'-(4-chlorobenzoyl)biphenyl; 4,4'-dichlorodiphenylsulphone or bis-4,4'-(4-chlorophenylsulphonyl)biphenyl.

In accordance with variation (c) of the present invention, mixtures of one or more halophenols with a mixture of at least one dihalide and at least one bisphenol may be employed. As an example of such mixtures there may be mentioned 4-(4-chlorobenzoyl)phenol in admixture with 4,4'-dichlorobenzophenone and either 4,4'-dihydroxybenzophenone or 4,4'-dihydroxydiphenyl sulphone.

In the preferred halophenols and dihalobenzenoid compounds, it is preferred that the groups Q and Q' if present are —CO— groups or a mixture of —CO— and —SO$_2$— groups in which the proportion of —SO$_2$— groups does not exceed 25% molar with respect to the total of —CO— and —SO$_2$— groups. In the preferred bisphenols, the group Y is preferably —CO— or a mixture of —CO— and —SO$_2$— in which the proportion of —SO$_2$— groups does not exceed 25% molar with respect to the total of —CO— and —SO$_2$— groups. If Y is a divalent aliphatic hydrocarbon radical, it is conveniently a radical such as a methylene or dimethylmethylene radical.

If a mixture of at least one dihalobenzenoid compound and at least one bisphenol compound is used, these compounds are preferably used in substantially equimolar amounts since an excess of either compound results in a reduction in the molecular weight of the polymer obtained. A slight excess of one compound, for example an excess of up to 5% mole, and especially of up to 2% mole, may be used and, in particular, an excess of the dihalide may be used. The molecular weight may also be controlled by the inclusion in the reaction mixture of a small proportion, for example less than 5% molar, and especially less than 2% molar, relative to the monomers, of a monofunctional compound such as a phenol or, preferably, an arylmonohalide. The polymerisation reaction may be carried out in the presence of an inert solvent, or in the absence of a solvent.

Preferably a solvent is employed and is an aliphatic or aromatic sulphoxide or sulphone of formula R—S(O)$_a$—R' where
a is 1 or 2; and
R and R', which may be the same or different, are alkyl or aryl groups, and may together form a divalent radical.

Solvents of this type include dimethyl sulphoxide, dimethyl sulphone, and sulpholane (1,1 dioxothiolan). The preferred solvents are aromatic sulphones of the formula

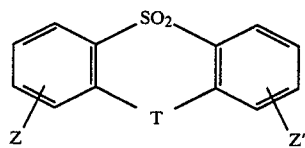

where

T is a direct link, an oxygen atom or two hydrogen atoms (one attached to each benzene ring); and Z and Z', which may be the same or different, are hydrogen atoms, alkyl, alkaryl, aralkyl or aryl groups.

Examples of such aromatic sulphones include diphenylsulphone, ditolylsulphone, dibenzothiophen dioxide, phenoxathiin dioxide and 4-phenylsulphonyl biphenyl. Diphenylsulphone is the preferred solvent. Other solvents that may be used include N,N-dimethyl formamide and N-methyl-2-pyrrolidone.

The polymerisation is effected in the presence of at least one base which is an alkali metal hydroxide, carbonate or bicarbonate.

If an alkali metal hydroxide is used, this is preferably pre-reacted with the phenol groups in the halophenol or bisphenol to form an alkali metal halo-phenate or bisphenate. The salt should preferably be in a finely divided form having a particle size of less than 1 mm, and preferably less than 500 micrometres. The salt is conveniently formed in aqueous or methanolic solution and, since the polymerisation should be effected in the essential absence of —OH containing compounds such as water and alcohols, it is necessary to remove such materials, including any water which is present as water of crystallisation, prior to effecting the polymerisation. Thus, the halophenol or the bisphenol may be stirred in a solution of an alkali metal hydroxide in a solvent such as water or a 90:10 by volume mixture of methanol and water. The reactants are preferably used in the ratio of one mole of phenol groups in the halophenol or bisphenol to at least one mole of hydroxide. The mixture is stirred until the phenol compound has dissolved and then the solvent may be evaporated off, for example by spray drying, to give the alkali metal salt, which may be in the hydrated form. Any hydrated salt which is obtained is preferably dehydrated by removing the water for example by evaporation under reduced pressure, or by heating the salt, preferably in the presence of a diaryl sulphone, at a temperature above 150° C., preferably above 200° C. and preferably under partial vacuum, e.g. 25 to 400 torr. A particular advantage in dehydration of the alkali metal salt in the presence of a diaryl sulphone in the polymerisation vessel is that there is no splashing of the salt on the walls of the reaction vessel and hence stoichiometry of the polymerisation reaction is maintained because the diaryl sulphone does not boil. Any dihalo-benzenoid monomers which are to be used in the polymerisation can then be added after evolution of water has ceased, for example as indicated by cessation of foaming. After removal of the water, and the addition of any necessary dihalobenzenoid monomers, the temperature is subsequently increased to the polymerisation temperature.

If the base is an alkali metal carbonate or bicarbonate, these are preferably used as the anhydrous materials. However, if hydrated salts are employed, these may be dehydrated during the period of heating up to the polymerisation temperature when a sufficiently high polymerisation temperature is being used.

The alkali metal hydroxide, carbonate or bicarbonate which is the base is used in greater than the stoichiometric proportion with respect to the phenolic groups in (a), (b) or (c). More than one base may be used and, in particular, a different base, for example an alkali metal carbonate or bicarbonate may be used to provide the excess of base if an alkali metal hydroxide has been pre-reacted, in a stoichiometric proportion, with a halophenol or bisphenol.

The excess of base is preferably an excess of in the range from 1 to 25%, particularly from 1 to 15% and especially from 3 to 6%, molar relative to the proportion of phenolic groups present in (a), (b) or (c).

A wide range of copper compounds may be used, both cupric and cuprous compounds being usable in accordance with the present invention. The copper compounds used should be stable under the polymerisation conditions and it is preferred that the copper compounds are essentially anhydrous. Copper compounds which can be used include cuprous chloride, cupric chloride, cupric acetylacetonate, cuprous acetate, cupric hydroxide, cuprous oxide, cupric oxide, basic cupric carbonate and basic cupric chloride. We have obtained particularly good results using cuprous oxide. Although a basic copper compound may be used, it is still necessary to use a stoichiometric excess of the alkali metal hydroxide, carbonate or bicarbonate.

The proportion of the copper compound used is preferably not more than 1% molar with respect to the total monomers present in (a), (b) or (c) and is preferably less than 0.4% molar with respect to the total monomers. It is usually desirable to use at least 0.01% molar of the copper compound with respect to the total monomers. The proportion of the copper compound is dependent upon the particular copper compound used and this can be determined readily by experiment.

The polymerisation reaction is carried out at an elevated temperature of at least 150° C., preferably from 250° C. up to 400° C., particularly from 280° C. up to 350° C. As with all chemical reactions, an increase in reaction temperature leads to shorter reaction times but with attendant risk of product decomposition and/or side reactions whereas a decrease in reaction temperature leads to longer reaction times but less product decomposition. However a temperature should be used which maintains the polymeric material in solution. In general the solubility of polymer in the polymerisation solvent, for example a diaryl sulphone, increases with temperature. Solubility also increases with increasing proportion of sulphone groups in the polymer chain. Accordingly, polymers having a higher proportion of sulphone groups can, if desired, be produced at slightly lower polymerisation reaction temperatures.

In order to obtain products of improved properties, when using a mixture of monomers, particularly as in (b) or (c), it may be advantageous to use a prepolymerisation heating stage in which the monomers are heated together at a temperature at which some oligomerisation occurs but little, if any, polymerisation occurs. For many of the monomer mixtures used in accordance with the present invention, such prepolymerisation heating can be effected at 200° C. to 250° C., particularly 220° C. to 245° C. The oligomerisation is believed to result in the formation of relatively involatile oligomers and hence to reduce the possibility of volatile monomers being removed from the reaction mixture.

To neutralise any reactive oxygen-containing anions, a reagent therefor may be introduced into the polymerisation reaction. Reactive monofunctional halides, for example methyl chloride, and reactive aromatic halides such as, for example, 4,4'-dichlorobenzophenone or 4-chlorobenzophenone are particularly suitable. At the completion of polymerisation, the reaction mixture may be (i) allowed to cool and, depending on the polymerisation solvent, to solidify, (ii) ground, (iii) treated to remove any polymerisation solvent, for example by extraction with a solvent for the polymerisation solvent, conveniently with an alcohol, for example methanol, or acetone and water, (iv) treated to remove copper residues, for example by treatment with boiling dilute hydrochloric acid, (v) washed to remove the acid, for example with water and finally (vi) dried. Alternatively, if the polymer has been efficiently end-capped, for example with 4,4'-dichlorobenzophenone, copper residues may be removed using a complexing agent for example an aqueous solution of ethylenediamine tetraacetic acid and thereafter washing with water or water and methanol.

The polymerisation is preferably carried out in an inert atmosphere e.g. argon or nitrogen. The reaction vessel can be made from glass but for operation on a large scale is preferably made from stainless steels (other than those which undergo surface crazing at the reaction temperatures in the presence of alkali metal halide), or made of, or lined with, titanium, nickel or an alloy thereof or some similarly inert material.

The products obtained by the process of the present invention are polyetherketones, which may contain a small proportion of sulphone groups, and are suitable for use in those applications for which polyetherketones have been proposed previously, particularly applications in which high service temperatures may be encountered. The polymers may be fabricated into shaped articles by moulding techniques, particularly injection moulding, or by extrusion into sheet, film or fibre, which extruded materials may be oriented if desired. In view of the good electrical insulating properties of many of the polymers, they are particularly useful for use as electric insulators.

By the process of the present invention, polymers of increased molecular weight, as indicated by inherent viscosity, may be obtained from chlorine- or bromine-containing monomers or a polymer of the same molecular weight may be obtained using a shorter polymerisation time.

In testing polymers obtained by the process of the present invention, the toughness of the polymers is determined. The test used to determine the toughness of a polymer is one in which a thin film (about 0.2 mm thick) is subjected to flexing. The film can be obtained by compression moulding a sample of the polymer at 400° C. in a press (4400 MN/m² for 5 minutes) and cooling slowly to induce complete crystallisation, for example by cooling the film in the press using air cooling, the film being taken out of the released press at 200° to 250° C. after 30 minutes cooling, and then allowing the film to further cool to room temperature. In the flexing test, initially the film is flexed through 180° C. to form a crease, whereby the two faces of the film formed about the crease touch. The film is then flexed through 360° at least 5 times about the crease so formed, and at each flexing the opposed faces on each side of the film about the crease touch each other. The film is compressed manually to form the crease line. If the film survives this treatment without breaking (e.g. snapping or tearing) it is deemed to be tough, if it fails on the formation of the initial crease it is deemed to be brittle and if it fails during the test it is regarded as moderately tough. Further aspects of the present invention are now set out in the following illustrative examples.

EXAMPLE 1

5.00 gms (2.15×10⁻² mole) of 4-chloro-4'-hydroxybenzophenone were mixed with 11.5 gms of diphenyl sulphone, 2.40 gms (2.40 ×10⁻² mole) of potassium bicarbonate and 0.025 gms of cuprous chloride in a glass reaction tube. The tube was purged with nitrogen whilst rotating the tube and contents. A stirrer ensured that the components were thoroughly mixed.

The tube and its contents were heated up to 300° C. and maintained at this temperature for 2 hours under nitrogen with constant stirring. After this time, the viscous melt was cooled to give a cream-pale yellow "toffee".

The "toffee" was broken into pieces which were then ground to a fine powder in a hammer mill containing a 1.0 mm sieve screen. The resulting powder was refluxed three times in 150 cm³ of acetone for each reflux. Each refluxing treatment was effected for 10 minutes to remove diphenyl sulphone solvent. The powder was then treated with dilute (1N) hydrochloric acid to remove copper residues. The treatment with the acid was effected by stirring with 150 cm³ of the acid at ambient temperature for 20 minutes. The treatment with the acid was effected three times. The powder was then washed with water and then with acetone, and the cream-white powder was dried for 16 hours in a vacuum oven at 145° C. and 40 kN/m² pressure.

The inherent viscosity of the polymer was determined by dissolving 0.05 gm of polymer in 50 cm³ of concentrated sulphuric acid (density 1.84 g/cm³) at 20° C. and measuring inherent viscosity at 30° C. The inherent viscosity was found to be 1.58. The yield of polymer was 94.0% based on the monomer. Carbon 13 and proton n.m.r. studies in trifluoromethane sulphonic acid showed the polymer to consist entirely of linear chains having the following formula

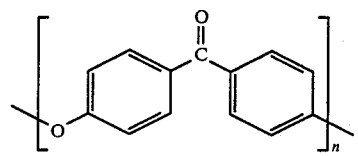

Chemical analysis of the polymer confirmed this formula. Residual levels of copper in the polymer were less than 5 ppm. The melting point of the polymer (Tm) was 370° C. and the glass transition temperature (Tg) was 155° C.

The powdered polymer was compression moulded at 400° C. for 5 minutes with a pressure of 4400 MN/m² then slowly cooled (as described herein) to give a tough opaque brown film. In comparative Examples A to D, the procedure of Example 1 was repeated but either the cuprous chloride was omitted (Comparative Example A), the potassium bicarbonate was used in only a stoichiometric proportion relative to the monomer (Comparative Examples B and C) or the cuprous chloride was omitted and the potassium bicarbonate was used in only a stoichiometric proportion. (Comparative Example D).

COMPARATIVE EXAMPLE A

The procedure of Example 1 was repeated but without any cuprous chloride present. A cream coloured polymer was obtained in 90% yield based on the monomer but gave an inherent viscosity of only 0.41. A film of the polymer obtained by compression moulding as in Example 1 was very brittle and easily crumbled.

COMPARATIVE EXAMPLE B

The procedure of Example 1 was repeated using 2.15 g of potassium bicarbonate ($2.15 \times 10^{-2}$ mole), that is a stoichiometric proportion with respect to the monomer. A cream coloured polymer was obtained in 91% yield based on the monomer but gave an inherent viscosity of only 0.33. A film of the polymer obtained by compression moulding as in Example 1 was very brittle.

COMPARATIVE EXAMPLE C

The procedure of Example 1 was repeated using 2.15 g of potassium bicarbonate ($2.15 \times 10^{-2}$ mole), that is a stoichiometric proportion with respect to the monomer, and 0.125 g ($0.125 \times 10^{-2}$ mole) of cuprous chloride, that is an increased amount of cuprous chloride compared to that used in Example 1. A cream coloured polymer was obtained in 91% yield based on the monomer but gave an inherent viscosity of only 0.38. A film of the polymer obtained by compression moulding as in Example 1 was very brittle.

COMPARATIVE EXAMPLE D

The procedure of Example 1 was repeated using 2.15 g ($2.15 \times 10^{-2}$ mole) potassium bicarbonate, that is a stoichiometric proportion with respect to the monomer, and no copper salt. A cream coloured polymer was obtained in 91% yield based on the monomer but gave an inherent viscosity of only 0.41. A film of the polymer obtained by compression moulding as in Example 1 was very brittle and easily crumbled.

EXAMPLE 2

The procedure of Example 1 was repeated using 5.00 g ($2.15 \times 10^{-2}$ mole) of 4-chloro-4'-hydroxybenzophenone, 11.5 g of diphenyl sulphone, 1.84 g ($1.332 \times 10^{-2}$ mole) of potassium carbonate and 0.028 g ($0.021 \times 10^{-2}$ mole) of cupric chloride. The polymerisation temperature was 300° C. and this temperature was maintained for a time of one hour.

The inherent viscosity of the cream-white granular polymer obtained was 2.08.

The powdered polymer was compression moulded at 400° C. for 5 mins with a pressure of 4400 MN/m² then slowly cooled (as described herein) to give a tough brown film.

COMPARATIVE EXAMPLE E

The procedure of Example 2 was repeated using 1.48 g ($1.072 \times 10^{-2}$ mole) of potassium carbonate, that is a stoichiometric proportion with respect to the monomer. The cream coloured polymer was obtained in 91% yield based on the monomer but gave an inherent viscosity of only 0.28. A film of the polymer obtained by compression moulding as in Example 2 was very brittle.

EXAMPLE 3

The procedure of Example 1 ws repeated using 5.00 g ($2.15 \times 10^{-2}$ mole) of 4-chloro-4'-hydroxybenzophenone, 11.5 g of diphenyl sulphone, 2.28 g ($2.28 \times 10^{-2}$ mole) of potassium bicarbonate and 0.028 ($0.021 \times 10^2$ mole) of cupric chloride. The polymerisation temperature was 300° C. and this temperature was maintained for a time of two hours.

The inherent viscosity of the cream-white granular polymer obtained was found to be 2.07.

The powdered polymer was compression moulded to give a tough light brown film.

EXAMPLE 4

The procedure of Example 3 was repeated with the addition of 0.054 g ($0.214 \times 10^{-2}$ mole) of 4,4'-dichlorobenzophenone to the reaction mixture.

The inherent viscosity of the cream-white granular polymer obtained was found to be 1.20.

The powdered polymer was compression moulded as in Example 1 to give a tough pale brown film.

EXAMPLE 5

5.00 g ($2.15 \times 10^{-2}$ mole) of 4-chloro-4'-hydroxybenzophenone were dissolved in 22.32 cm³ of a 1.075 N potassium hydroxide solution in a 9:1 by volume methanol:water mixture, that is a solution containing 1.34 g of potassium hydroxide ($2.40 \times 10^{-2}$ mole) at room temperature in a reaction tube. The solution was then blown to dryness in a nitrogen stream whilst being heated at 80° to 100° C. A bright orange crystalline salt was obtained and this was dried for two hours at 120° C. and a pressure of 25N/m² and the dry material was powdered in a pestle and mortar. The powdered material was placed in a reaction tube and 11.5 g of diphenyl sulphone and 0.025 g ($0.025 \times 10^{-2}$ mole) of cuprous chloride were added to the reaction tube. The polymerisation procedure and work-up procedure on the polymer were identical to that described in Example 1. The polymerisation temperature was 300° C. and this was maintained for two hours.

The inherent viscosity of the cream-white granular polymer obtained was found to be 1.46.

The powdered polymer was compression moulded as in Example 1 to give a moderately tough brown film.

COMPARATIVE EXAMPLE F

The procedure of Example 5 was repeated but without any cuprous chloride present. The cream coloured polymer obtained gave an inherent viscosity of 0.29.

COMPARATIVE EXAMPLE G

The procedure of Example 5 was repeated using 1.204 g of potassium hydroxide (20 cm³ of the 1.075 N potassium hydroxide solution ($2.15 \times 10^{-2}$ mole)), that is a stoichiometric proportion with respect to the monomer and 0.025 g ($0.025 \times 10^{-2}$ mole) of cuprous chloride.

The inherent viscosity of the cream-white polymer obtained was found to be 0.214.

EXAMPLE 6

The procedure of Example 1 was repeated using 5.00 g ($2.15 \times 10^{-2}$ mole) of 4-chloro-4'-bydroxybenzophenone, 11.5 g of diphenyl sulphone, 2.01 g ($2.40 \times 10^{-2}$ mole) of sodium bicarbonate, 0.028 g ($0.021 \times 10^{-2}$ mole) of cupric chloride and 0.04 g ($0.158 \times 10^{-2}$ mole) of 4,4'-dichlorobenzophenone. The polymerisation reaction was carried out for two hours at a temperature of 300° C.

The inherent viscosity of the cream-white granular polymer obtained was found to be 1.54. The polymer was confirmed to be linear polyetherketone as formulated in Example 1.

The powdered polymer was compression moulded as in Example 1 and slowly cooled (as described herein) to give a tough fawn coloured opaque film. A second moulding was made but the molten polymer was quenched rapidly from 400° C. The resulting moulding was a very tough clear straw coloured film.

COMPARATIVE EXAMPLE H

The procedure of Example 6 was repeated but using 1.805 g ($2.15 \times 10^{-2}$ mole) of sodium bicarbonate, that is a stoichiometric preparation with respect to the monomer.

The inherent viscosity of the cream-white polymer obtained was found to be 0.28.

COMPARATIVE EXAMPLE I

The procedure of Example 6 was repeated but without any cupric chloride present. A cream coloured polymer was obtained in 95% yield based on the monomer but gave an inherent viscosity of only 0.28. A film of the polymer, obtained by compression moulding as in Example 1, was very brittle and easily crumbled.

EXAMPLE 7

20 g ($8.60 \times 10^{-2}$ mole) of 4-chloro-4'-hydroxybenzophenone was mixed with 66.0 g of diphenyl sulphone, 8.48 g ($10.1 \times 10^{-2}$ mole) of sodium bicarbonate, 0.112 g ($0.084 \times 10^{-2}$ mole) of cupric chloride and 0.20 g of 4,4'-dichlorobenzophenone in a 250 cm$^3$ flanged flask. The flask was purged with nitrogen whilst the contents were gently stirred with a stainless steel stirrer.

The flask and contents were heated on an oil bath to 200° C. under nitrogen with gentle stirring. The temperature was held at 200° C. for 15 mins whilst evolution of carbon dioxide and water occurred. The temperature was then raised so that the reaction mixture was at 300° C. The polymerisation was carried out at 300° C. for 2.5 hours, then the viscous melt was cooled to give a pale yellow "toffee".

Further treatment of the "toffee" to obtain a white granular polymer was as described in Example 1. The inherent viscosity of the polymer was found to be 1.57.

The powdered polymer was compression moulded as in Example 1 to give an opaque, tough fawn coloured film.

EXAMPLE 8

The procedure of Example 1 was repeated using 5.00 g ($2.15 \times 10^{-2}$ mole) of 4-chloro-4'-hydroxybenzophenone, 16.5 g of diphenyl sulphone, 1.91 g ($2.28 \times 10^{-2}$ mole) of sodium bicarbonate, 0.021 g ($0.021 \times 10^{-2}$ mole) of cuprous chloride and 0.045 g of 4,4'-dichlorobenzophenone. The polymerisation reaction was carried out for two hours at a temperature of 300° C.

The inherent viscosity of the cream/white granular polymer obtained was found to be 1.54.

The powdered polymer was compression moulded as in Example 1 to give a tough fawn coloured opaque film.

EXAMPLE 9

The procedure of Example 1 was repeated using 5.00 g ($2.15 \times 10^{-2}$ mole) of 4-chloro-4'-hydroxybenzophenone, 16.5 g of diphenyl sulphone, 1.91 g ($2.276 \times 10^{-2}$ mole) of sodium bicarbonate, 0.054 g ($0.021 \times 10^{-2}$ mole) of cupric acetylacetonate and 0.045 g of 4,4'-dichlorobenzophenone. The polymerisation reaction was carried out for two hours at 300° C.

The inherent viscosity of the cream/white granular polymer obtained was found to be 1.63.

The powdered polymer was compression moulded as in Example 1 to give a tough light brown opaque film.

COMPARATIVE EXAMPLE J

The procedure of Example 9 was repeated using 1.805 g ($2.15 \times 10^{-2}$ mole) of sodium bicarbonate, that is a stoichiometric proportion with respect to the monomer and 0.054 g ($0.021 \times 10^{-2}$ mole) of cupric acetylacetonate.

The inherent viscosity of the cream/white polymer obtained was found to be 0.21.

EXAMPLE 10

The procedure of Example 1 was repeated using 5.00 g ($2.15 \times 10^{-2}$ mole) of 4-chloro-4'-hydroxybenzophenone, 16.5 g of diphenyl sulphone, 1.91 g ($2.276 \times 10^{-2}$ mole) of sodium bicarbonate, 0.024 g ($0.021 \times 10^{-2}$ mole) of cuprous acetate and 0.045 g of 4,4'-dichlorobenzophenone. The polymerisation reaction was carried out for two hours at 300° C.

The inherent viscosity of the cream/white granular polymer obtained was found to be 0.93.

The powdered polymer was compression moulded as in Example 1 to give a moderately tough light brown opaque film.

COMPARATIVE EXAMPLE K

The procedure of Example 10 was repeated using 1.805 g ($2.15 \times 10^{-2}$ mole) of sodium bicarbonate, that is a stoichiometric proportion with respect to the monomer and 0.024 g ($0.021 \times 10^{-2}$ mole) of cuprous acetate.

The inherent viscosity of the cream/white polymer obtained was found to be 0.25.

EXAMPLE 11

The procedure of Example 1 was repeated using 5.00 g ($2.15 \times 10^{-2}$ mole) of 4-chloro-4'-hydroxybenzophenone, 16.5 g of diphenyl sulphone, 1.40 g ($1.32 \times 10^{-2}$ mole) of sodium carbonate, 0.028 g ($0.021 \times 10^{-2}$ mole) of cupric chloride and 0.027 g of 4,4'-dichlorobenzophenone. The polymerisation reaction was carried out for 2 hours at 300° C.

The inherent viscosity of the cream/white granular polymer obtained was found to be 1.93.

The powdered polymer was compression moulded as in Example 1 to give a tough light brown opaque film.

COMPARATIVE EXAMPLE L

The procedure of Example 11 was repeated using 1.14 g ($1.08 \times 10^{-2}$ mole) of sodium carbonate, that is a stoichiometric proportion with respect to the monomer and 0.028 g ($0.021 \times 10^{-2}$ mole) of cupric chloride.

The inherent viscosity of the cream/white polymer obtained was found to be 0.30.

EXAMPLE 12

The procedure of Example 1 was repeated using 5.00 g ($2.15 \times 10^{-2}$ mole) 4-chloro-4'-hydroxybenzophenone, 16.5 g of diphenyl sulphone, 1.91 g ($2.28 \times 10^{-2}$ mole) of sodium bicarbonate, 0.021 g ($0.021 \times 10^{-2}$ mole) of cupric hydroxide and 0.050 g of 4,4'-dichlorobenzophenone. The polymerisation reaction was carried out for two hours at 300° C.

The inherent viscosity of the cream/white granular polymer obtained was found to be 1.57.

The powdered polymer was compression moulded as in Example 1 to give a tough fawn coloured opaque film.

COMPARATIVE EXAMPLE M

The procedure of Example 12 was repeated using 1.805 g ($2.15 \times 10^{-2}$ mole) of sodium bicarbonate, that is a stoichiometric proportion with respect to the monomer and 0.021 g ($0.021 \times 10^{-2}$ mole) of cupric hydroxide.

The inherent viscosity of the cream/white polymer obtained was found to be 0.59. A film of the polymer, obtained by compression moulding as in Example 1, was very brittle and easily crumbled.

EXAMPLE 13

The procedure of Example 1 was repeated using 5.00 g ($2.15 \times 10^{-2}$ mole) of 4-chloro-4'-hydroxybenzophenone, 16.5 g of diphenylsulphone, 2.02 g ($2.40 \times 10^{-2}$ mole) of sodium bicarbonate, 0.023 g ($0.01 \times 10^{-2}$ mole) of basic cupric carbonate ($CuCO_3 \cdot Cu(OH)_2$) and 0.050 g of 4,4'-dichlorobenzophenone. The polymerisation reaction was carried for two hours at 300° C.

The inherent viscosity of the cream/white granular polymer obtained was found to be 1.32.

The powdered polymer was compression moulded as in Example 1 to give a tough light brown coloured opaque film.

EXAMPLE 14

The procedure of Example 1 was repeated using 5.00 g ($2.15 \times 10^{-2}$ mole) of 4-chloro-4'-hydroxybenzophenone, 16.5 g of diphenyl sulphone, 1.85 g ($2.21 \times 10^{-2}$ mole) of sodium bicarbonate, 0.023 g ($0.011 \times 10^{-2}$ mole) of the basic copper chloride $Cu_2(OH)_3Cl$ and 0.04 g of 4,4'-dichlorobenzophenone. The polymerisation reaction was carried out at for two hours at 300° C.

The inherent viscosity of the cream/white granular polymer obtained was found to be 0.836.

The powdered polymer was compression moulded as in Example 1 to give a fawn coloured opaque film which was tough in one direction but brittle in the other direction.

EXAMPLE 15

The procedure of Example 1 was repeated using 5.00 g ($2.15 \times 10^{-2}$ mole) of 4 chloro-4'-hydroxybenzophenone, 16.5 g of diphenyl sulphone, 1.913 g ($2.279 \times 10^{-2}$ mole) of sodium bicarbonate, 0.012 g ($0.0084 \times 10^{-2}$ mole) of cuprous oxide and 0.054 g of 4,4'-dichlorobenzophenone. The polymerisation reaction was carried out for 2.5 hrs at 310° C.

The inherent viscosity of the white granular polymer was found to be 1.452.

The powdered polymer was compression moulded as in Example 1 to give a tough fawn coloured opaque film.

A second moulding was made but the molten polymer was quenched rapidly from 400° C. The resulting moulding was a very tough clear straw coloured film.

COMPARATIVE EXAMPLE N

The procedure of Example 15 was repeated using 1.805 g ($2.15 \times 10^{-2}$ mole) of sodium bicarbonate, that is a stoichiometric proportion with respect to the monomer and 0.012 g ($0.0084 \times 10^{-2}$ mole) of cuprous oxide.

The inherent viscosity of the cream/white polymer obtained was found to be 0.74.

The powdered polymer was compression moulded as in Example 1 to give a brittle fawn coloured opaque film.

COMPARATIVE EXAMPLE O

The procedure of Example 15 was repeated but without any cuprous oxide present. A cream coloured polymer was obtained but gave an inherent viscosity of only 0.31. A film of the polymer, obtained by compression moulding as in Example 1, was very brittle and easily crumbled.

EXAMPLE 16

The procedure of Example 1 was repeated using 5.00 g ($2.15 \times 10^{-2}$ mole) of 4 chloro-4'hydroxybenzophenone, 16.5 g of diphenyl sulphone, 1.910 g ($2.279 \times 10^{-2}$ mole) of sodium bicarbonate, 0.015 g ($0.019 \times 10^{-2}$ mole) of cupric oxide and 0.054 g of 4,4'-dichloro-benzophenone. The polymerisation reaction was carried out for 2.5 hours at 300° C.

The inherent viscosity of the white granular polymer was found to be 1.292.

The powdered polymer was compression moulded as in Example 1 to give a tough grey coloured film.

COMPARATIVE EXAMPLE P

The procedure of Example 16 was repeated using 1.805 g ($2.15 \times 10^{-2}$ mole) of sodium bicarbonate, that is a stoichiometric proportion with respect to the monomer and 0.015 g ($0.019 \times 10^{-2}$ mole) of cupric oxide.

The inherent viscosity of the cream/white polymer obtained was found to be 0.68. A film of the polymer, obtained by compression moulding as in Example 1, was brittle and easily crumbled.

EXAMPLE 17

15 g ($6.45 \times 10^{-2}$ mole) of 4-chloro-4'-hydroxybenzophenone were mixed with 75 g of diphenyl sulphone, 5.634 g ($6.71 \times 10^{-2}$ mole) of sodium bicarbonate, 0.06 g ($0.042 \times 10^{-2}$ mole) of cuprous oxide and 0.20 g of 4,4'-dichlorobenzophenone in a 200 cm$^3$ flanged flask. The flask was purged with nitrogen whilst the contents were stirred with a stainless steel stirrer.

The flask and contents were heated on an oil bath to 200' C. under nitrogen with gentle stirring. The temperature was held at 200° C. for 30 minutes whilst evolution of carbon dioxide and water occurred. The temperature was then raised so that the reaction mixture was at 300° C. The polymerization was carried out at 300° C. for 3 hours, then the viscous melt was cooled to give a pale yellow "toffee".

The "toffee" was broken into pieces which were then ground to a fine powder in a hammer mill containing a 1.0 mm sieve screen. The resulting powder was refluxed three times using 250 cm$^3$ of acetone for each reflux. Each refluxing treatment was effected for 30 minutes to remove diphenyl sulphone solvent. The powder was then treated with a 0.05 M aqueous solution of ethylene diamine tetraacetic acid (EDTA) to remove copper residues. The treatment with EDTA solution was affected by stirring twice with 200 cm$^3$ of EDTA solution at ambient temperature (20° C.) for 30 minutes. A third treatment with the EDTA solution was carried out at 60° C. for 30 minutes. The powder was then refluxed twice with 150 cm$^3$ of water and then once with 150 cm$^3$ of methanol. A cream-white powder was obtained and this was dried for 16 hours in a vacuum oven at 145° C. and 40 kN/m$^2$ pressure. The yield of polymer was >95% based on the monomer. The residual level of copper in the polymer was less than 12 ppm. The melting point of the polymer (Tm) was 365° C., the glass transition temperature (Tg) was 166° C. and the crystallisation temperature (Tc) from the melt was 321° C.

The powdered ploymer was compression moulded at 400° C. for 3 minutes with a pressure of 4400 MN/m$^2$ then cooled to 250° C. over a 30 minute period to give a tough opaque fawn coloured film.

The melt stability of the powdered polymer was assessed by three techniques. In a DSC experiment the crystallisation peak was examined. The polymer was held at 410° C. for 15 minutes then cooled at 20° C./minute to 200° C. and the temperature, height and area of the crystallisation peak noted. The temperature was then raised from 200° C. to 410° C. The polymer was then held at 410° C. for a further 15 and cooled to 200° C. according to the foregoing procedure. The heating at 410° C. and cooling to 200° C. was carried out a total of four times giving a total time at 410° C. of one hour. After this treatment, the crystallisation peak height and area had changed by less than 10%. The crystallisation peak temperature (Tc) had fallen by 4° C. Using Weisenberg cone and plate Rheogoniometer for 1 hour at 400° C. with an applied shear of 100 rad/second gave a change in melt viscosity of less than 10%. Finally the melt viscosity (MV) of the polymer was determined in a melt flow ram extruder, and was remeasured after maintaining the polymer at 400° C. for 1 hour in the extruder. The melt viscosity was determined by subjecting the molten polymer to a shear of 1000 rad/sec whilst being extruded through a 0.5 mm die. The melt viscosity increased by only +8% and the extrudate showed no evidence of decomposition.

EXAMPLE 18

The procedure of Example 17 was repeated using 15 g (6.45×10$^{-2}$ mole) of 4-chloro-4'-hydroxybenzophenone, 75 g of diphenyl sulphone, 5.726 g (6.82×10$^{-2}$ mole) of sodium bicarbonate, 0.06 g (0.042×10$^{-2}$ mole) of cuprous oxide and 0.162 g of 4-chlorobenzophenone in a 200 cm$^3$ flanged flask. The polymerization reaction was carried out for 3 hours at a temperature of 320° C.

The inherent viscosity of the polymer was found to be 0.96. The powdered polymer was compression moulded at 400° C. for 3 minutes with a pressure of 4400 MN/m$^2$ then cooled to 250° C. over a 30 minute period to give a tough opaque fawn coloured film.

The melt stability was determined by DSC and by cone and plate experiments at 400° C., both as described in Example 17. In the DSC test, the crystallisation peak size and crystallinity changed by less than 10% whilst the Tc fell by 3° C. In the cone and plate test the melt viscosity of the polymer showed an increase of less than 10%.

EXAMPLE 19

2.53 g (1.01×10$^{-2}$ mole) of 4,4'-dichlorobenzophenone and 2.14 g (1.00×10$^{-2}$ mole) of 4,4'-dihydroxybenzophenone were mixed with 20.0 g of diphenyl sulphone, 1.78 g (2.12×10$^{-2}$ mole) of sodium bicarbonate and 0.015 g (0.0105×10$^{-2}$ mole) of coprous oxide in a glass reaction tube. The procedure described in Example 17 was then repeated with an inital temperature of 200° C. for 15 minutes followed by 2.5 hours at 300° C.

A creamy-white polymer was obtained in greater than 95% yield. The inherent viscosity of the polymer in concentrated sulphuric acid at 30° C. was found to be 0.71.

A DSC study of the polymer gave a melt endotherm (Tm) at 365° C., a glass transition temperature (Tg) at 162° C. and a crystallisation temperature from the melt (Tc) of 325° C.

Carbon—13 and proton n.m.r. studies of the polymer in solution in trifluoromethane sulphonic acid showed the polymer to consist entirely of linear chains having the following formula

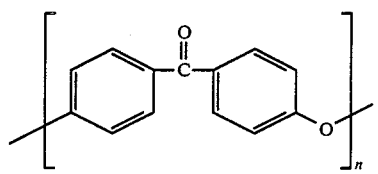

The powdered polymer was compression moulded at 400° C. for 3 minutes with a pressure of 4400 MN/m$^2$ then cooled to 250° C. over a 30 minute period to give a brittle opaque fawn coloured film.

COMPARATIVE EXAMPLE Q

The procedure of Example 19 was repeated without any cuprous oxide present.

A cream coloured polymer was obtained in greater than 96% yield but gave an inherent viscosity of only 0.23.

The powdered polymer was compression moulded at 400° C. for 3 minutes then cooled to 250° C. over a 30 minute period. The resulting material crumbled to a powder.

EXAMPLE 20

3.03 g (1.201×10$^{-2}$ mole) of 4,4'-dichlorobenzophenone and 2.22 g (1.195×10$^{-2}$ mole) of 4,4'-dihydroxybiphenyl were mixed with 20.0 g of diphenyl sulphone, 2.13 g (2.53×10$^{-2}$ mole) of sodium bicarbonate and 0.02 g (0.014×10$^{-2}$ mole) of cuprous oxide in a glass reaction tube. The procedure described in Example 17 was then repeated with an initial temperature of 200° C. for 15 minutes, followed by 3.5 hours at 320° C.

A creamy-white polymer was obtained in greater than 95% yield. The inherent viscosity of the polymer in concentrated sulphuric acid at 30° C. was found to be 1.28.

A DSC study of the polymer gave a melt endotherm (Tm) at 395° C., a glass transition temperature (Tg) at 175° C. and a crystallisation temperature from the melt (Tc) at 359° C.

Carbon—13 and proton n.m.r. studies of the polymer in solution in trifluoromethane sulphonic acid showed the polymer to consist entirely of linear chains having the following formula:

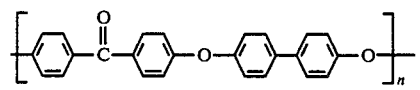

The powdered polymer was compression moulded at 430° C. for 3 minutes with a pressure of 4400 MN/m$^2$ then cooled to 250° C. over a 30 minute period to give a moderately tough opaque fawn coloured film.

COMPARATIVE EXAMPLE R

The procedure of Example 20 was repeated without any cuprous oxide present.

A cream coloured polymer was obtained in greater than 96% yield but gave an inherent viscosity of only 0.51.

The powdered polymer was compression moulded at 430+ C. for 3 minutes then cooled to 250° C. over at 30 minutes period. The resulting film crumbled to a powder.

EXAMPLE 21

3.75 g (1.612×10$^{-2}$mole) of 4-chloro-4'-hydroxybenzophenone, 1.25 g (0.484×10$^{-2}$mole) of 4-chloro-4'-hydroxydiphenylsulphone, 0.07 g (0.0251×10$^{-2}$mole) of 4,4'-dichlorodiphenylsulphone, 20.0 g of diphenyl sulphone, 1.851 g (2.21×10$^{-2}$mole) of sodium bicarbonate and 0.020 g (0.014×10$^{-2}$mole) of cuprous oxide were mixed in glass reaction tube. The procedure described in Example 17 was then repeated with an initial temperature of 200° C. for 15 minutes followed by 2.5 hours at 320° C.

A creamy-white polymer was obtained in greater than 96% yield. The inherent viscosity of the polymer in concentrated sulphuric acid at 30° C. was found to be 1.75.

A DSC study of the polymer gave a melt endotherm (Tm) at 311° C., a glass transition temperature (Tg) at 167° C. and a crystallisation temperature from the melt (Tc) at 250° C.

The powdered polymer was compression moulded at 420+ C. for 3 minutes then cooled to 250° C. over a 30 mm period. The resulting film was tough, opaque and light brown in colour.

COMPARATIVE EXAMPLES

The procedure described in Example 21 was repeated without any cuprous oxide being present.

A cream coloured polymer was obtained in greater than 96% yield but gave an inherent viscosity of only 0.65.

The powdered polymer was compression moulded at 420° C. for 3 minutes then cooled to 250° C. over a 30 minute period. The resulting film was brittle.

EXAMPLE 22

1.0 g of 4-hydroxy-4'-(4-chlorobenzoyl) diphenyl ether, 4.2 mg of cupric chloride, 0.23 g of potassium carbonate and 3 g of diphenylsulphone were added to a B24 test-tube with a side arm tap. The tube was fitted with a glass stirrer and PTFE paddle. The vessel and contents were evacuated for 5 minutes and then brought to atmospheric pressure under a nitrogen atmosphere. The mixture was stirred and immersed in an oil bath at 150° C. Over a period of 35 minutes the temperature of the bath was gradually raised to 315° C. and was then held at this temperature for one hour. The stirrer was lifted from the reaction mass which was then allowed to cool. The resulting solid was ground in acetone. It was then washed with acetone, 2M aqueous hydrochloric acid, acetone, 2M aqueous hydrochloric acid, water and acetone successively on a sintered filter funnel, and the final residue was pumped dry at 100° C. and 40 kN/m$^2$pressure for 16 hours. A yiels of 0.78 g was obtained.

The product gave an IV of 0.54.

COMPARATIVE EXAMPLE R

The procedure of Example 22 was repeated except that no cupric chloride was used, and the amount of potassium carbonate was 0.213 g. In the work up procedure, the washing with aqueous hydrochloric acid was omitted. A yield of 0.68 g was obtained.

The product gave an IV of 0.40.

I claim:

1. A process for the preparation of an aromatic polymer which comprises
    (a) effecting the condensation of at least one halophenol; or
    (b) effecting the condensation of a mixture of at least one bisphenol with at least one dihalo-benzenoid compound; or
    (c) effecting the condensation of (i) at least one halophenol and (ii) a mixture of at least one bisphenol with at least one dihalobenzenoid compound in the presence of at least one base and at least one copper compound wherein the base is in a stoichiometric excess relative to the phenolic groups in (a), (b) or (c), at least one of the compounds in (a), (b) or (c) is a compound containing a ketone group, and in the halophenol or the dihalo-benzenoid compound the, or each, halogen atom is activated by an inert electron-withdrawing group in at least one of the positions ortho- or para- to the halogen atom.

2. The process of claim 1 wherein the inert electron—withdrawing group is a sulphone group or a ketone group which is in a para-position to the, or each, halogen atom.

3. The process of claim 1 wherein the halophenol is a material of the formula.

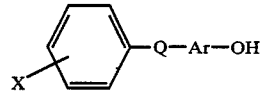

wherein
X is a halogen atom which is ortho- or para- to the group Q;
Q is a —SO$_2$— or —CO— group;
Ar is an aromatic radical; and
at least the group Q is —CO— or Ar contains a —CO— group.

4. The process of claim 1 wherein the bisphenol is a compound of the formula

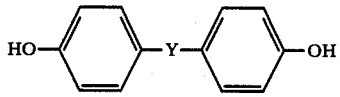

wherein
Y is an oxygen or sulphur atom, a —SO$_2$— or —CO— group, a divalent aliphatic hydrocarbon radical or a direct link.

5. The process of claim 4 wherein the dihalo-benzenoid compound is a compound of the formula

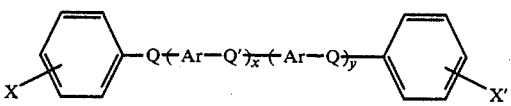

wherein
Ar is an aromatic radical;
Q is a —SO$_2$— or —CO— group;

$Q^1$ is an oxygen or sulphur atom, a —SO$_2$— or —CO— group, or a divalent aliphatic hydrocarbon radical;

X and $X^1$, which may be the same or different, are halogen atoms and are ortho- or para- to the groups Q and $Q^1$;

x is 0, 1 or 2; and y is 0 or 1 and y is one when x is 1 or 2; and at least one of Q and $Q^1$ is a —CO— group.

6. The process of claim 1 which is effected in the presence of a solvent which is an aromatic sulphone of the formula

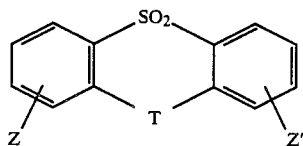

wherein

T is a direct link, an oxygen atom or two hydrogen atoms (one attached to each benzene ring); and Z and $Z^1$, which may be the same or different, are hydrogen atoms, alkyl, alkaryl, aralkyl or aryl groups.

7. The process of claim 1 wherein the at least one base is an alkali metal hydroxide, carbonate or bicarbonate.

8. The process of claim 1 wherein the excess of base is in the range of from 1 to 25% molar relative to the phenolic groups present in (a), (b) or (c).

9. The process of claim 1 wherein the copper compound is selected from cupric chloride, cuprous chloride, cupric acetylacetonate, cuprous acetate, cupric hydroxide, cuprous oxide, cupric oxide, basic cupric carbonate and basic cupric chloride.

10. The process of claim 1 wherein from 0.01 up to 1% molar of the copper compound is used with respect to the total monomers.

* * * * *